(12) United States Patent
Marzorati et al.

(10) Patent No.: US 11,855,933 B2
(45) Date of Patent: Dec. 26, 2023

(54) ENHANCED CONTENT SUBMISSIONS FOR SUPPORT CHATS

(71) Applicant: KYNDRYL, INC., New York, NY (US)

(72) Inventors: Mauro Marzorati, Lutz, FL (US); Todd Russell Whitman, Bethany, CT (US); Jeremy R. Fox, Georgetown, TX (US); Sarbajit K. Rakshit, Kolkata (IN)

(73) Assignee: KYNDRYL, INC., New York, NY (US)

( * ) Notice: Subject to any disclaimer, the term of this patent is extended or adjusted under 35 U.S.C. 154(b) by 20 days.

(21) Appl. No.: 17/445,529

(22) Filed: Aug. 20, 2021

(65) Prior Publication Data

US 2023/0057821 A1 Feb. 23, 2023

(51) Int. Cl.
*G06F 15/16* (2006.01)
*H04L 51/02* (2022.01)
(Continued)

(52) U.S. Cl.
CPC ............ *H04L 51/02* (2013.01); *G06T 19/006* (2013.01); *H04L 51/10* (2013.01); *G06T 2200/24* (2013.01); *G06T 2219/024* (2013.01)

(58) Field of Classification Search
CPC ............... G06T 19/006; G06T 2200/24; G06T 2219/024
See application file for complete search history.

(56) References Cited

U.S. PATENT DOCUMENTS 9,854,066 B1 * 12/2017 Harper .................... H04L 67/02
10,452,915 B1 10/2019 Chikkaveerappa
(Continued)

FOREIGN PATENT DOCUMENTS

KR 20210062988 A * 6/2021
KR 20220011906 A * 2/2022
(Continued)

OTHER PUBLICATIONS

A. Peña-Rios, H. Hagras, M. Gardner and G. Owusu, "A Fuzzy Logic based system for Mixed Reality assistance of remote workforce," 2016 IEEE International Conference on Fuzzy Systems (FUZZ-IEEE), 2016, pp. 408-415, doi: 10.1109/FUZZ-IEEE.2016.7737716. (Year: 2016).*
(Continued)

*Primary Examiner* — Yves Dalencourt
(74) *Attorney, Agent, or Firm* — Dan Housley; Andrew M. Calderon; Calderon Safran & Cole P.C.

(57) ABSTRACT

A computer-implemented method, a computer system and a computer program product enhance content submissions of support chats. The method includes acquiring a support request from a user, wherein the support request includes a content submission. The content submission is selected from a group consisting of audio data, image data and text data. The method also includes determining a classification of the support request based on a request type. The method further includes obtaining a set of requirements for the support request from a server based on the determined classification. In addition, the method includes determining that the content submission does not meet the set of requirements. Lastly, the method includes generating an augmented reality inspector to assist the user in adding content to meet the set of requirements in response to the set of requirements not being met by the content submission.

20 Claims, 5 Drawing Sheets

(51) Int. Cl.
  *H04L 51/10* (2022.01)
  *G06T 19/00* (2011.01)

(56) References Cited

U.S. PATENT DOCUMENTS

| | | | |
|---|---|---|---|
| 10,630,840 B1* | 4/2020 | Karp | H04M 3/5235 |
| 10,978,056 B1* | 4/2021 | Challa | G06F 16/3344 |
| 11,082,559 B1* | 8/2021 | Koneru | H04M 3/493 |
| 11,200,742 B1* | 12/2021 | Post | G06T 19/003 |
| 11,244,385 B1* | 2/2022 | Fraser | G06F 3/0482 |
| 11,250,515 B1* | 2/2022 | Feiteira | G06N 20/00 |
| 11,438,508 B2* | 9/2022 | Hu | H04N 5/232411 |
| 2011/0314049 A1 | 12/2011 | Poirier | |
| 2013/0278635 A1* | 10/2013 | Maggiore | G06F 3/0304 |
| | | | 345/633 |
| 2014/0176603 A1 | 6/2014 | Kumar | |
| 2014/0310595 A1 | 10/2014 | Acharya | |
| 2016/0078449 A1* | 3/2016 | Banerjee | G06Q 30/016 |
| | | | 705/304 |
| 2018/0285595 A1* | 10/2018 | Jessen | H04L 67/535 |
| 2019/0073110 A1* | 3/2019 | Bradley | G06T 11/60 |
| 2019/0244425 A1* | 8/2019 | Koohmarey | H04N 5/00 |
| 2020/0285225 A1 | 9/2020 | Lankehanumaiah | |
| 2020/0394016 A1* | 12/2020 | Trim | G10L 15/26 |
| 2021/0119945 A1* | 4/2021 | Sohum | G06N 20/00 |
| 2021/0224818 A1* | 7/2021 | Choudhary | G06F 16/3329 |
| 2022/0028176 A1* | 1/2022 | Madden | G06V 20/52 |
| 2022/0091723 A1* | 3/2022 | Faulkner | G06T 15/506 |
| 2022/0207269 A1* | 6/2022 | Holub | G06K 7/1413 |

FOREIGN PATENT DOCUMENTS

| | | |
|---|---|---|
| WO | 2016159461 A1 | 10/2016 |
| WO | WO-2021126244 A1 * | 6/2021 |

OTHER PUBLICATIONS

Avadhanula et al., "Artificial Intelligence and Augmented Reality based Skin Rash Diagnosis System," ResearchGate, Jul. 2017, https://www.researchgate.net/publication/320703991_Artificial_Intelligence_and_Augmented_Reality_based_Skin_Rash_Diagnosis_System 14 pages.

Disclosed Anonymously, "Augmented Reality Photography Assistant," IP.com, IP.com No. IPCOM000251898D, IP.com Publication Date: Dec. 11, 2017, 11 Pages.

Frost, "IBM developing AI-powered IoT software to help manage aging infrastructure," Traffic Technology Today, Apr. 26, 2019, https://www.traffictechnologytoday.com/news/infrastructure/ibm-developing-ai-powered-iot-software-to-help-manage-aging-infrastructure.html, 4 pages.

Hitti, "Samsung's artificial Neon humans are "a new kind of life"," De Zeen, Jan. 15, 2020, https://www.dezeen.com/2020/01/15/samsung-neon-star-labs-artificial-humans/, 13 pages.

Holz et al., "Mixed Reality Agents as Museum Guides," 2nd Agent-Based Systems for Human Learning (ABSHL) Workshop, AAMAS'06, May 8-12, 2006, 10 pages.

IBM, "Workplace services with Watson," IBM.com, Accessed: Jul. 1, 2021, Retrieved from the Internet: https://www.ibm.com/services/digital-workplace/watson-support, 4 pages.

Mell et al., "The NIST Definition of Cloud Computing", National Institute of Standards and Technology, Special Publication 800-145, Sep. 2011, 7 pages.

Scope AR, "Scope AR Launches Revolutionary AR Authoring Platform—Worklink Create," Accessed: Jul. 1, 2021, Retrieved from the Internet: https://www.scopear.com/home/, 11 pages.

Trim et al., "Object Attribution Derivation Via Crowd-Sourced Optical Sensors," Application and Drawings, Filed on Feb. 28, 2020, 33 Pages, U.S. Appl. No. 16/804,534.

* cited by examiner

ENHANCED CONTENT SUBMISSIONS FOR SUPPORT CHATS

BACKGROUND

Embodiments relate generally to information processing for presentation in augmented reality (AR), and more specifically to using augmented reality to enhance content submissions in a support chat in order to meet minimum requirements.

Users may seek support from vendors for many everyday tasks. When doing so, the user may be in contact with a human support agent but more frequently, the user may be interacting with an artificial intelligence (AI) agent, or chatbot. This interaction may use augmented reality and allow the user to ask textual or verbal questions, in response to which the chatbot may use text or speech recognition techniques such as speech-to-text or natural language processing (NLP) algorithms to understand and then reply to the user via the AR interface. In this way, the chatbot may request further information from the user if the content supplied by the user is incomplete and assist the user in understanding the requirements and collecting the needed content.

SUMMARY

An embodiment is directed to a computer-implemented method for enhancing content submissions of support chats. The method may include acquiring a support request from a user, wherein the support request includes a content submission. The content submission may be selected from a group consisting of audio data, image data and text data. The method may also include determining a classification of the support request based on a request type. The method may further include obtaining a set of requirements for the support request from a server based on the determined classification. In addition, the method may include determining that the content submission does not meet the set of requirements. Lastly, the method may include generating an augmented reality inspector to assist the user in adding content to meet the set of requirements in response to the set of requirements not being met by the content submission.

In a further embodiment, the method may include detecting a change in the content submission for the support request. The method may also include determining if the change in the content submission meets the set of requirements. lastly, the method may include updating the augmented reality inspector based on the change in the content submission.

In yet another embodiment, the method may include generating a three-dimensional (3D) or panoramic bubble photograph from the content submission.

In still another embodiment, obtaining the set of requirements may include selecting a support session from a plurality of support sessions classified based on request type. The support session may include a support request. Obtaining the set of requirements may also include receiving a human interaction score for the selected support session. Lastly, obtaining the set of requirements may include updating the set of requirements based on the content submission of the support request in response to the human interaction score being above a threshold.

In an embodiment, generating the augmented reality inspector may include displaying an image to the user, the image being visible to the user through an augmented reality device and providing a set of instructions to the user for improving the content submission.

In another embodiment, the method may include monitoring an action of the user. The method may also include updating the set of instructions based on the action of the user.

In a further embodiment, a machine learning classification model that determines the request type from user interactions and submitted content may be used to determine the request type.

In addition to a computer-implemented method, additional embodiments are directed to a system and a computer program product for enhancing content submissions of support chats.

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

DETAILED DESCRIPTION

Figure 1:
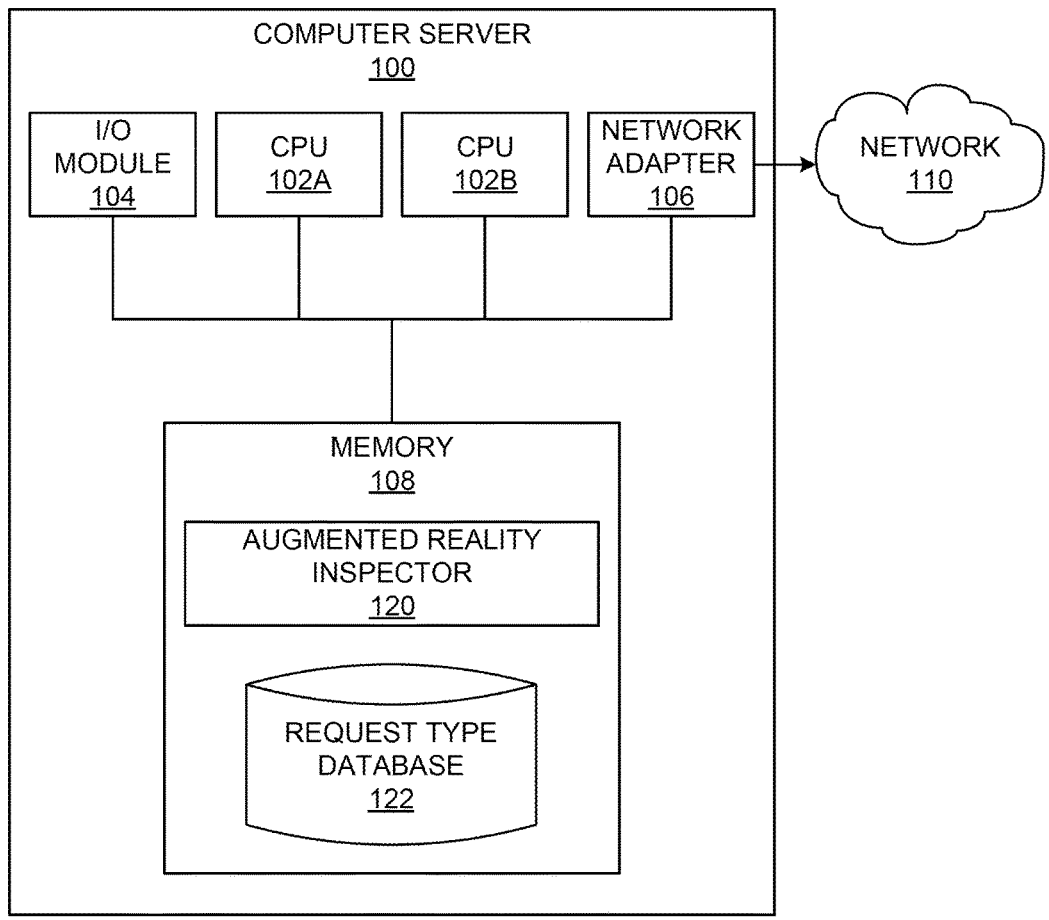
FIG. 1 depicts a block diagram of an example computer system in which various embodiments may be implemented.

Remote services or support may increasingly use an artificial intelligence (AI) agent in lieu of users interacting with a human agent. In many cases, especially with remote automated diagnosis, images captured with local cameras may be required to investigate a problem. The remote chatbot may require images from various directions of impacted areas and objects, which may then be analyzed to identify a specific problem, as well as determine if additional images are needed to provide remote assistance. To provide such imagery, a user may need to connect to an online service to submit photographs the user has taken from different directions. In addition to images, in order to provide optimum support, an automated agent may require a minimum level of information that may be submitted by a user through text, such as responses to a form, or audio that may be captured with a microphone and converted to text for analysis by the automated agent. The automated agent may be able to classify a support request by type and then, using this type, determine requirements for an optimum support request.

However, the user may not know what types of information, e.g., photographs or specific details, the automated agent may use to get the best outcome from the remote service. As a result, users frequently do not get an effective outcome because of incomplete information, which may lead to frustration and ineffective use of the service. To get effective instructions, suggestions and/or outcomes, the user may need to unnecessarily spend a considerable amount of time to add to the submitted content and meet the requirements of the automated agent, usually through trial and error due to difficulties in communication between the user and the automated agent. In addition, user-supplied photography is susceptible to manipulation, which can be thwarted or exposed through successive images, which may require more instructions, further lengthening the process.

What is needed is a method to allow the automated agent to efficiently provide support such that the user may be guided by the agent to provide the information that is needed and meet the requirements for an optimum support request that have been determined by the agent. Such an improvement in support chat interaction may greatly enhance the user experience and allow for more efficient and rapid response to support requests by remote services.

A remote server providing an automated support agent, or chatbot, to users may use augmented reality to provide such support. An augmented reality (AR) interface with a headset, also known as AR "glass," may be provided to the user. AR may offer a real-time view of a physical, real-world environment whose elements are "augmented" by computer-generated sensory input such as sound, video, graphics and positioning data. A display of a real-world environment may be enhanced by augmented data pertinent to using an augmented reality device. As an example, an augmented reality application may allow a user to view their surrounding environment through a camera, which may also determine the user's position based on global positioning satellite (GPS) data, triangulation of the device's location, or other positioning methods. The application may then overlay the camera view of the surrounding environment with location-based data such as local shops, restaurants and move theaters as well as the distance to landmarks, cities and the like.

The automated support agent may interact with AR glass worn by a user to create an artificial human inspector, which may also be overlaid on the AR view of the user and may appropriately guide the user through a support session, including guidance to focus on specific areas to capture information that may be required for optimum support and analysis. Such an inspector may be able to interact with the user and also be aware of the user's surroundings, such that the inspector may point to specific areas that need to be photographed or may direct the user to move accordingly to provide multiple images from multiple angles. In addition, such an inspector may be able to examine the text or audio submissions from a user and identify where the requirements are not met and assist the user with adding content to bring the submission up to the determined requirements. Such assistance may increase the efficiency of the interaction and enhance the possibility of a successful outcome.

Referring now to FIG. 1, a block diagram of a computer server 100, in which processes involved in the embodiments described herein may be implemented, is shown. Computer server 100 represents computer hardware, e.g., user computing device 210 in FIG. 2, that runs the software described in the embodiments. Computer server 100 may include one or more processors (CPUs) 102A-B, input/output circuitry 104, network adapter 106 and memory 108. CPUs 102A-B execute program instructions in order to carry out the functions of the present communications systems and methods. FIG. 1 illustrates an embodiment in which computer server 100 is implemented as a single multi-processor computer system, in which multiple CPUs 102A-B share system resources, such as memory 108, input/output circuitry 104, and network adapter 106. However, the present communications systems and methods also include embodiments in which computer server 100 is implemented as a plurality of networked computer systems, which may be single-processor computer systems, multi-processor computer systems, or a mix thereof. Input/output circuitry 104 provides the capability to input data to, or output data from, computer server 100. Network adapter 106 interfaces computer server 100 with a network 110, which may be any public or proprietary LAN or WAN, including, but not limited to the Internet.

Memory 108 stores program instructions that are executed by, and data that are used and processed by, CPU 102A-B to perform the functions of computer server 100. Memory 108 may include, for example, electronic memory devices, such as random-access memory (RAM), read-only memory (ROM), programmable read-only memory (PROM), electrically erasable programmable read-only memory (EEPROM), flash memory, etc., and electro-mechanical memory, such as magnetic disk drives, tape drives, optical disk drives, etc., which may use an Integrated Drive Electronics (IDE) interface, or a variation or enhancement thereof, such as enhanced IDE (EIDE) or Ultra-Direct Memory Access (UDMA), or a Small Computer System Interface (SCSI) based interface, or a variation or enhancement thereof, such as fast-SCSI, wide-SCSI, fast and wide-SCSI, etc., or Serial Advanced Technology Attachment (SATA), or a variation or enhancement thereof, or a Fibre Channel-Arbitrated Loop (FC-AL) interface.

The contents of memory 108 may vary depending upon the function that computer server 100 is programmed to perform. In the example shown in FIG. 1, example memory contents are shown representing routines and data for embodiments of the processes described herein. However, it may be recognized that these routines, along with the memory contents related to those routines, may not be included on one system or device, but rather may be distributed among a plurality of systems or devices, based on well-known engineering considerations. The present communications systems and methods may include any and all such arrangements.

Included within memory 108 may be the augmented reality inspector 120 which may run the routines that are described in the embodiments below. In order to store information that may be relevant to a classification of a request by type and also to the determining of that classification, the augmented reality inspector 120 may access a request type database 122 that may store any non-sensitive information as described below. Also, as the augmented reality inspector 120 interacts with new captured images, audio and subsequent related text data, it may update the request type database 122 to include the information that it determines is relevant and non-sensitive. The request type database 122 may be in any form that holds necessary information about the type of a request, as described below, or other relevant and non-sensitive information. The classification decisions for support requests, as well as corresponding requirements for optimum support requests for the request type, may also be stored in the request type database 122.

Figure 2:
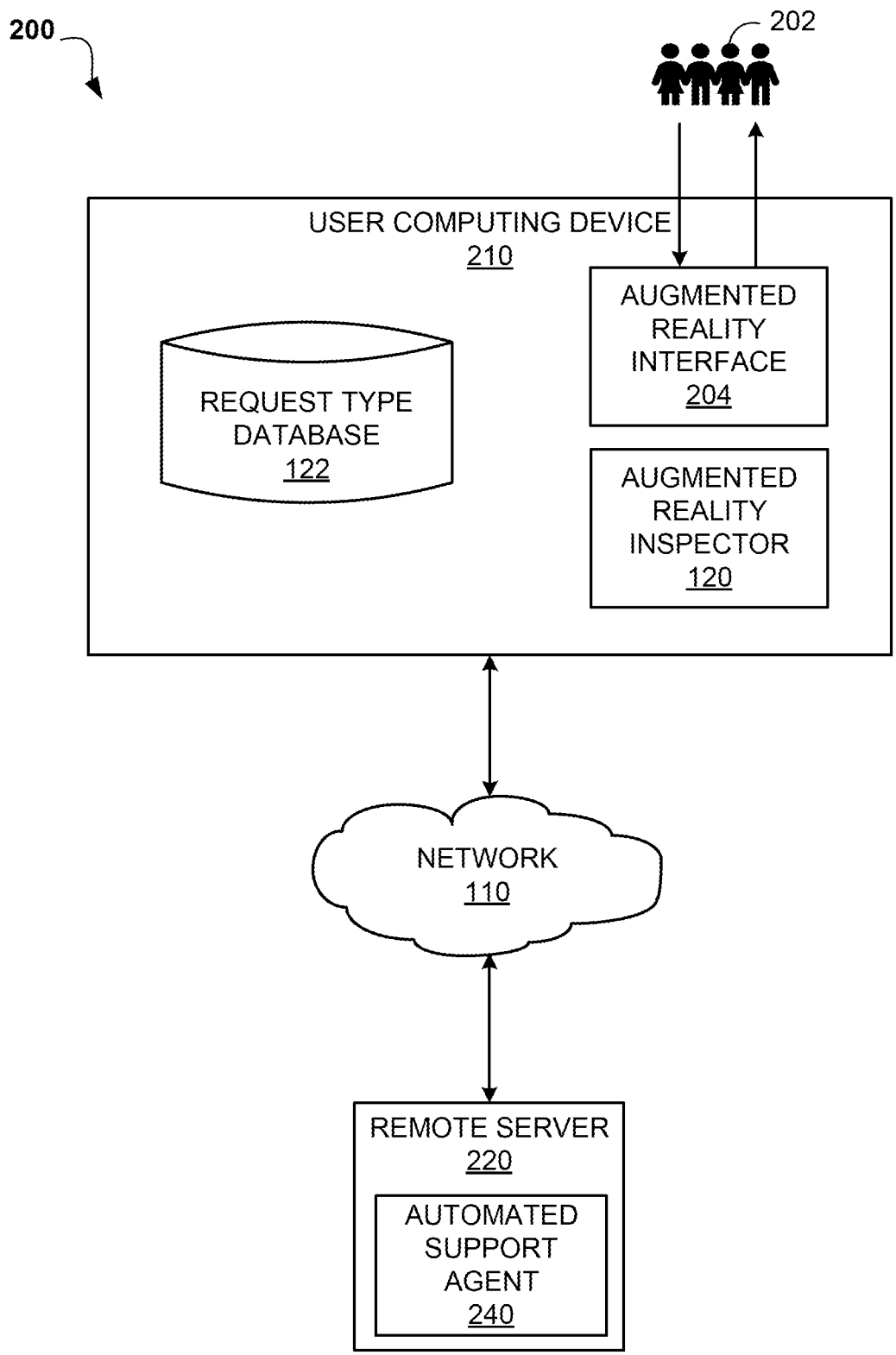
FIG. 2 depicts a block diagram of a computing system that may be used to provide an augmented reality interface to an automated support agent to a user according to an embodiment.

The communication network 110 may include various types of communication networks, such as a wide area network (WAN), local area network (LAN), a telecommunication network, a wireless network, a public switched network and/or a satellite network. The communication network 110 may include connections, such as wire, wireless communication links, or fiber optic cables. The network 110 may also include additional hardware not shown such as routers, firewalls, switches, gateway computers and/or edge servers. It may be appreciated that FIG. 2 provides only an illustration of one implementation and does not imply any limitations with regard to the environments in which different embodiments may be implemented. Many modifications to the depicted environments may be made based on design and implementation requirements. Accordingly, the communication network 110 may represent any communication pathway between the various components in the example 200 of FIG. 2.

Referring to FIG. 2, an example 200 of providing a support chat session with an automated support agent 240 is shown according to an embodiment. A user 202 may interact with the automated support agent 240 operating on a remote server 220 by wearing an augmented reality interface 204 such as AR glass or other method of presenting an AR environment to the user 202. The AR interface 204 may include the hardware that is worn by the user 202 and also software running on a local user computing device 210, as depicted in FIG. 2.

Also included in the user computing device 210 may be an augmented reality inspector 120, further described below, as software running on the user computing device 210. The augmented reality inspector 120 may use the AR interface 204 to communicate with the user 202. In addition, the user computing device 210 may include the request type database 122 to store the classification data that may be generated by the machine learning model to make decisions about content in a support chat session. One of ordinary skill in the art may recognize that while the augmented reality inspector 120 and request type database 122 are shown in FIG. 2 as being loaded and running in the user computing device 210, it may not be required for these components to run on this specific device. As software, these components may run in the remote server 220 or may be in a third server in the cloud using the network 110.

Remote server 220 may be used to provide the automated support agent 240 to be contacted in the support chat session. As with the augmented reality inspector 120 and request type database 122, the automated support agent 240 may be software that is loaded on any server. Therefore, the automated support agent 240 may run on the user computing device 210 or another server in the cloud and connected using the network 110. The automated support agent 240 may manage the connection between the user computing device 210 and remote server 220 as a part of handling the support chat session.

In the example of a support chat session shown in FIG. 2, the user 202 may wear the AR glass and initiate a session with the automated support agent 204. It is important to note that the user 202 may not be required to initiate the session. In an embodiment, a session may be automatically initiated in the event that the need for support is recognized. For instance, the user may be interacting with a web site, such as a page connected to the user's auto insurance company, and it may be determined that a claim is being reported and that the user 202 needs assistance in completing the claim. In such an instance, the web site may notify the user 202 about the ability to complete the claim using the automated support agent 240 and also collect the user's consent to use such a service and collect content from the user 202.

It is important to note that any monitoring and collection of data from a support chat session as mentioned herein requires the informed consent of all those people whose data is captured for analysis. Consent may be obtained in real time or through a prior waiver or other process that informs a subject that their data may be captured by appropriate devices or other sensitive personal data may be gathered through any means and that this data may be analyzed by any of the many algorithms that may be implemented herein. A user 202 may opt out of any portion of the support chat session monitoring at any time.

Once a session has been initiated, the user 202 may use the augmented reality interface 204 to begin interacting with the automated support agent 240. In the example shown, the user 202 is communicating via the AR glass, meaning that the automated support agent 240 may project the augmented reality inspector 120 in front of the user 202 to speak with the user 202. The conversation may be as though there were a human agent standing and conversing with the user 202. Audio data may be captured and converted to text using automatic speech recognition (ASR) algorithms, and natural language processing algorithms may be used to recognize meaning in the user's utterances such that the automated support agent may understand a conversation with the user 202 and communicate intelligently. The support chat session may also use text-only input from the user 202, in which case the text may be directly read and analyzed by the automated support agent 240 using the same algorithms to support an intelligent conversation between the user 202 and the automated support agent 240.

In addition to the conversation between the user 202 and automated support agent 240, a user 202 may have the ability to upload content to support the chat session. Content may include forms provided to the user 202 that may have been completed or other materials that an agent may require. Content may also include audiovisual data such as images of a vehicle or a scene that may be used to show something specific such as damage, in the case of a vehicle, or a view of the general surroundings of the user 202 to determine context for the purposes of the support chat session.

The automated support agent 240 may use the data that it may receive, either a conversation with the user or supporting content that the user 202 may upload to the automated support agent 240, to classify the support chat session by type. A type may include the type of response that the user 202 may expect to receive, such as an answer to one or more questions or, as in the case of an insurance claim, the fact that an incident may be reported to the automated support agent 240. The automated support agent 240 may use a supervised machine learning model to accomplish the classification, as described further with respect to FIG. 3.

Once a request type is known, the automated support agent 240 may then retrieve the appropriate requirements for the classified type from an appropriate source and compare any content that has been received from the user to the requirements that it has retrieved. The augmented reality inspector 120, taking direction from the automated support agent 240, may notify the user 202 that they have successfully completed their session or notify the user 202 that not all information that is needed has been received. If further images are needed, such as different angles from the ones provided or different parts of a vehicle, for instance, then the augmented reality inspector 120, projected on the AR glass of the user 202, may directly show the user 202 how to move themselves or their camera to provide the further information. The augmented reality inspector 120 may also notify the user that additional forms are needed to complete a successful session.

Figure 3:
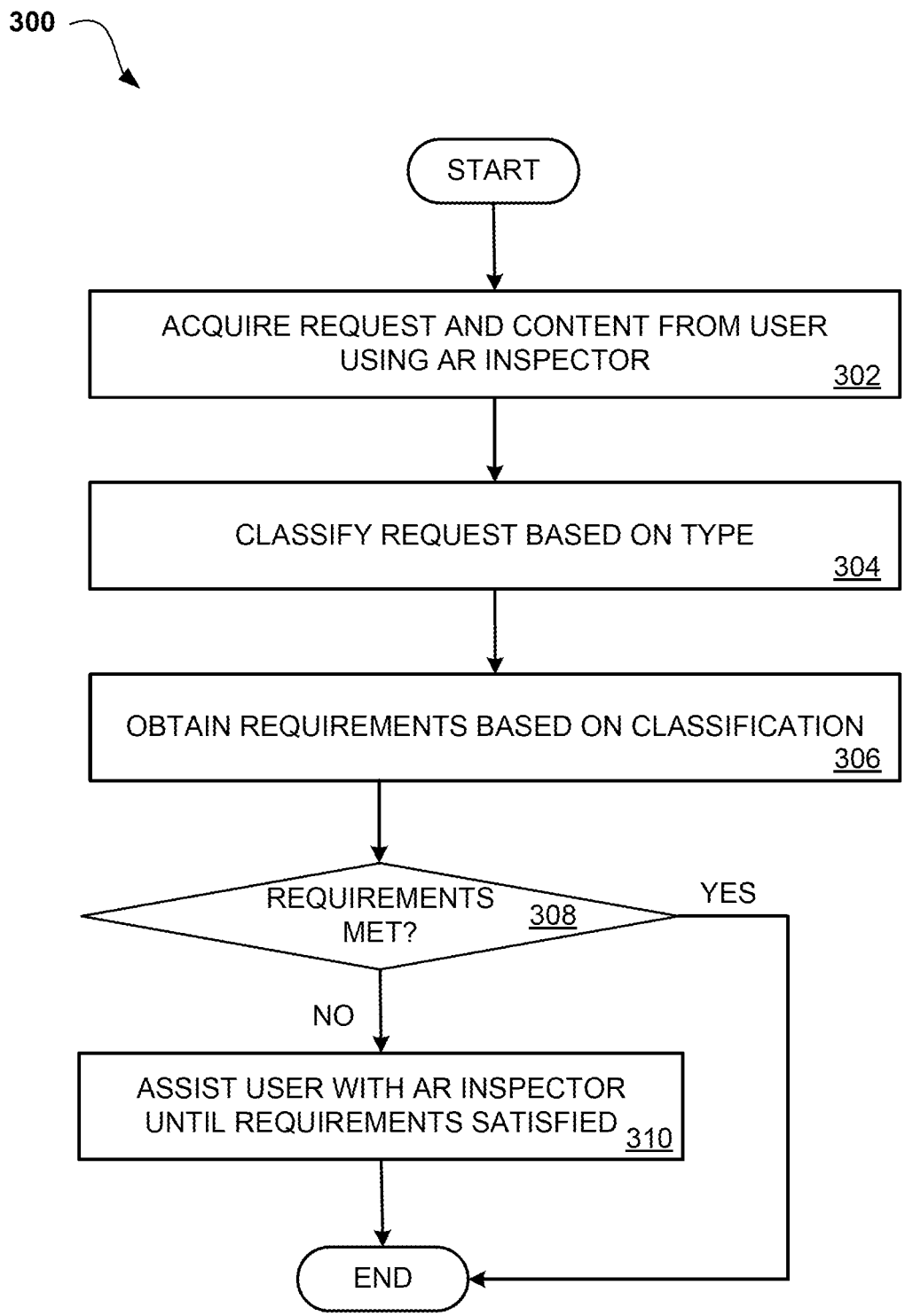
FIG. 3 depicts a flow chart diagram for a process to enhance content of support chats according to an embodiment.

Referring to FIG. 3, an operational flowchart illustrating a process 300 for enhancing content submissions for support chats is depicted according to at least one embodiment. At 302, an automated support agent, or chatbot may be contacted and a support request may be collected, along with content submitted to add detail to the support request. The content supporting the request may consist of image data, audio data or text data. For example, if the request concerns a claim to an auto insurer regarding an incident, the content may include a text submission with the important details of the incident, such as witness reports from one or more drivers, a report from the authorities of the incident if available, as well as images of the insured automobile from multiple angles.

At 304, the support request may be classified by type. In the auto insurance example above, it may be necessary to know what is being requested. Submission of a claim with respect to an incident may require a different response than a request for insurance or for confirmation of valid insurance. In another example, a support center may handle many different types of support in multiple industries, and it may be necessary to classify a request by industry, such as auto insurance as mentioned above or information technology (IT) technical support or remote telemedicine. One of ordinary skill in the art will recognize that there are many industries that may benefit from automated support agents and the list of examples is not exhaustive.

In an embodiment, a supervised machine learning classification model may be trained to predict the type of request. One or more of the following machine learning algorithms may be used: logistic regression, naive Bayes, support vector machines, deep neural networks, random forest, decision tree, gradient-boosted tree, multilayer perceptron, and one-vs-rest. In an embodiment, an ensemble machine learning technique may be employed that uses multiple machine learning algorithms together to assure better prediction when compared with the prediction of a single machine learning algorithm. In this embodiment, training data for the model may include past support sessions conducted with the support agent or through the augmented reality interface of the user. The training data may be collected from a single user or a group of users, with user consent required prior to collection of any training data. The classification results may be stored in a database so that the data is most current, and the output would always be up to date.

At 306, requirements for optimum support requests of the classified type may be acquired. In an embodiment, once the automated support agent is aware of the type of request, the agent may look through a history of support sessions that may have been conducted via the support center to determine the content that may be required to provide useful support. For instance, in the auto insurance example, it may be necessary to have images of the vehicle from specific angles to determine the level of damage that may have been sustained in an incident. At the same time, it may not be necessary to submit a report from the authorities if an incident is determined to be minor. It is not necessary that an agent go through the history at the time of the request, a set of requirements may be built into the model that is used in the previous step, meaning that the database that contains the discovered request types may also include information pertaining to the requirements for an optimum support request. What is required is that the agent acquire a set of requirements for an optimum support request in the processing of the support request.

It should be noted that the requirements for optimum support requests that may be initially acquired may also be updated by analyzing crowd-sourcing information. For instance, the recording of prior support chat sessions that may be conducted by a support center may also include receiving social media interactions (e.g., "likes") that may have been registered by the respective users, such that accurate feedback and information about the success of support requests may be known. Human interaction, or resonance, scores based on the social media interactions may be assigned for each support chat session in the history and saved with the support chat session in a database. Higher human interaction scores may also correlate with higher success, or more optimum support requests and therefore, the content submission related to the support request may include items that made the support request successful, and this may be checked for possible changes to the requirements of a certain request type.

To accomplish the update, the content that may have been uploaded by a user 202 as a part of the support request in the support chat sessions with higher human interaction scores for a certain request type may be compared to the requirements that have been acquired for that request type. If there are additional items in the content submission of the support request with the correct request type and included in a support chat session with a high human interaction score, i.e., above a threshold, the requirements may be updated with the additional items from the support chat session with the goal of maximizing the chances of success for a current support chat session.

At 308, it may be determined if the collected content meets the acquired requirements. This may be accomplished by comparing the content to the requirements and determining if all the information that is needed has been submitted. If the requirements are met, then no further action is required by the automated agent and the support request may proceed to its conclusion. However, if the requirements are not met, the process may continue to 310 for the automated agent to assist the user in improving the content and information that may have been submitted. It should be noted that a determination of meeting the requirements may extend beyond whether a certain minimum level of information is required. For instance, it may be determined that an image that has been submitted has poor quality or the subject of the image is not visible for any reason. Image recognition and object recognition techniques may be used to detect such a problem and the instructions given to the user may be modified such that the user 202 is aware of the problem and may take corrective action. The requirements may not be limited to which items are included in the content submission but may also include a certain minimum level of quality and the specific items that are included within the respective content.

At 310, if the requirements have not been met, then the automated agent may interface with the augmented reality (AR) interface of the user to generate an AR inspector that may assist the user in adding content to meet the requirements. In an embodiment, a holographic image of an inspector may be projected on the display of the user's AR glass. This inspector may be overlaid onto the view such that the user may interact with the inspector and the surrounding environment. In this embodiment, the inspector may also be aware of the user's surrounding through images that have been previously submitted or by interfacing with a camera embedded in a mobile device of the user. In this way, the inspector may be able to show a user how to meet the requirements. For example, if a request for an auto insurance claim did not include any vehicle photos, the inspector may appear on the screen while the user is standing near their vehicle and visually show the user where to take photographs. Since the inspector is a holographic image of a human, the inspector may point to the areas on the vehicle that need photographs and also direct the user to move to different locations and provide multiple angles. In addition, the inspector may comment on the text or audio submission that was submitted to identify deficiencies and indicate any additional information that may be required to bring the content up to the requirements for the support request.

In a further embodiment, the inspector may also provide instructions to the user 202 for generating a three-dimensional or panoramic bubble photograph from images of the user's augmented reality environment and physical surroundings. This photograph may have the purpose of assisting a human agent, who may not be present in the current session, in understanding the content submission and the user's environment. This may allow for human intervention in assisting the user 202 with improving the content submission in the event that the automated support agent makes a determination that it is unable to assist the user 202 in improving the content submission and achieving a successful outcome from the support chat session.

As mentioned in 308, the data that may have been submitted by the user 202 may also have poor quality. In the case of image data, there may be an object blocking the item of interest in the image. In the case of audio data, the voice in the data may be unrecognizable to a speech recognition algorithm, which may in turn be unable to convert the speech to text. Natural language processing algorithms may be unable to understand the meaning in a submission. These types of problems may be detected using the appropriate algorithms and also included in the requirements such that the AR inspector may give the user 202 appropriate instructions to correct them.

It should be noted that step 310 may be an iterative process such that the augmented reality inspector 120 may assist the user 202, which may result in added content for the support request and the augmented reality inspector may adjust its guidance based on the added content. If the requirements are met by the added content, then the support request may continue to completion just as described in step 308. However, if the requirements are not met, the augmented reality inspector 120 may adjust its guidance and provide further assistance to the user 202. For instance, if the requirements indicate that an image of a specific object should be included in the content submission and the user adds new images of different objects or simply does not add one with the required object, the inspector may use object recognition techniques on any new images in the content submission to determine that the required object is still not contained in any images and make an indication to the user. Likewise, if the object is contained in a new image, the inspector may detect the new image and adjust its guidance to the user 202 accordingly, moving on to other deficiencies with respect to the requirements or indicating to the user 202 that the requirements are now met. One of ordinary skill in the art may recognize that there may be several repeated steps in the process that may continue until the requirements are met.

It is to be understood that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g., networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported, providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure that includes a network of interconnected nodes.

Figure 4:
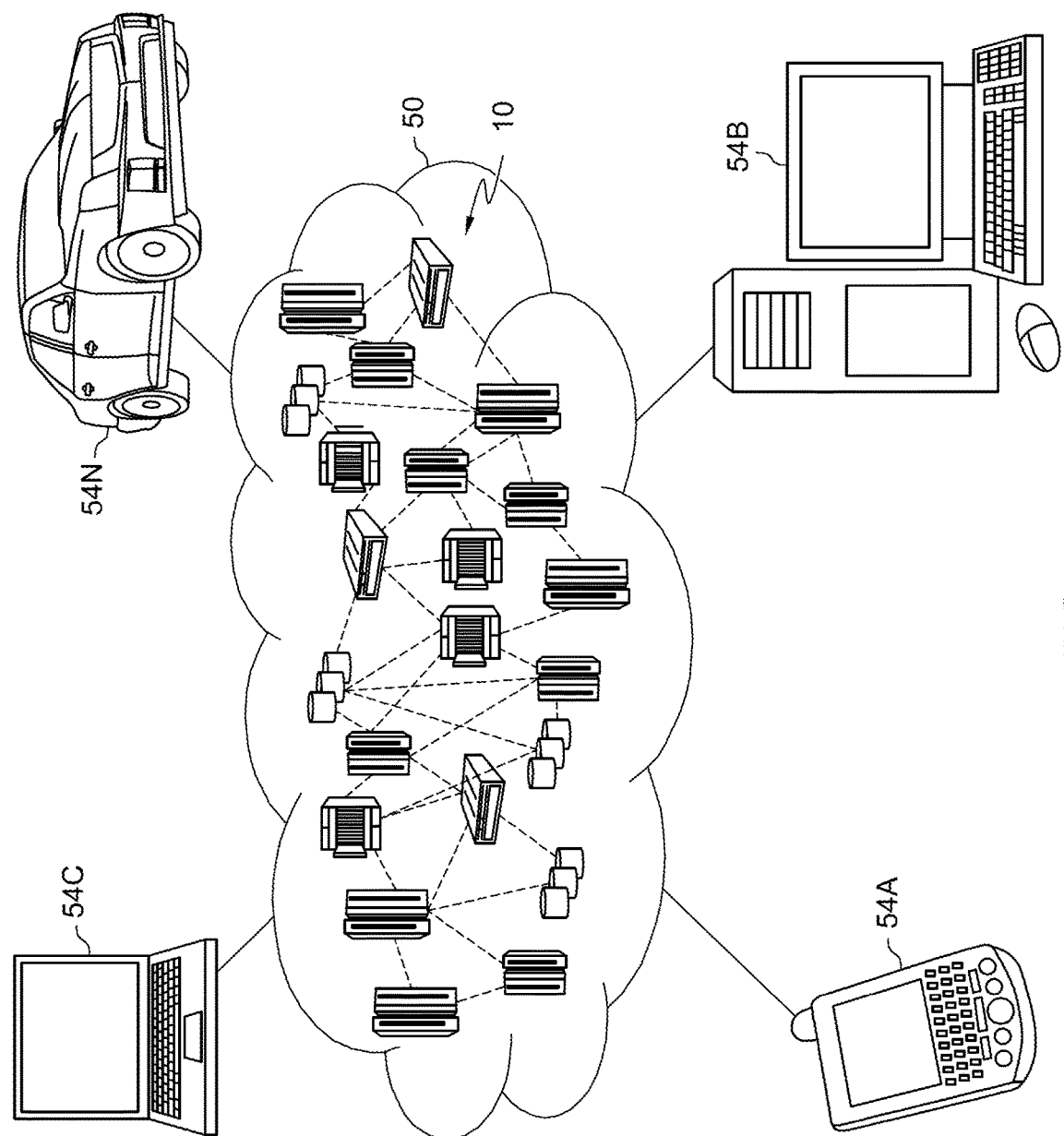
FIG. 4 depicts a cloud computing environment according to an embodiment.

Referring now to FIG. 4, illustrative cloud computing environment 50 is depicted. As shown, cloud computing environment 50 includes one or more cloud computing nodes 10 with which local computing devices used by cloud consumers, such as, for example, personal digital assistant (PDA) or cellular telephone 54A, desktop computer 54B, laptop computer 54C, and/or automobile computer system 54N may communicate. Nodes 10 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A-N shown in FIG. 4 are intended to be illustrative only and that computing nodes 10 and cloud computing environment 50 can communicate with any type of computerized device over any type of network and/or network addressable connection (e.g., using a web browser).

Figure 5:
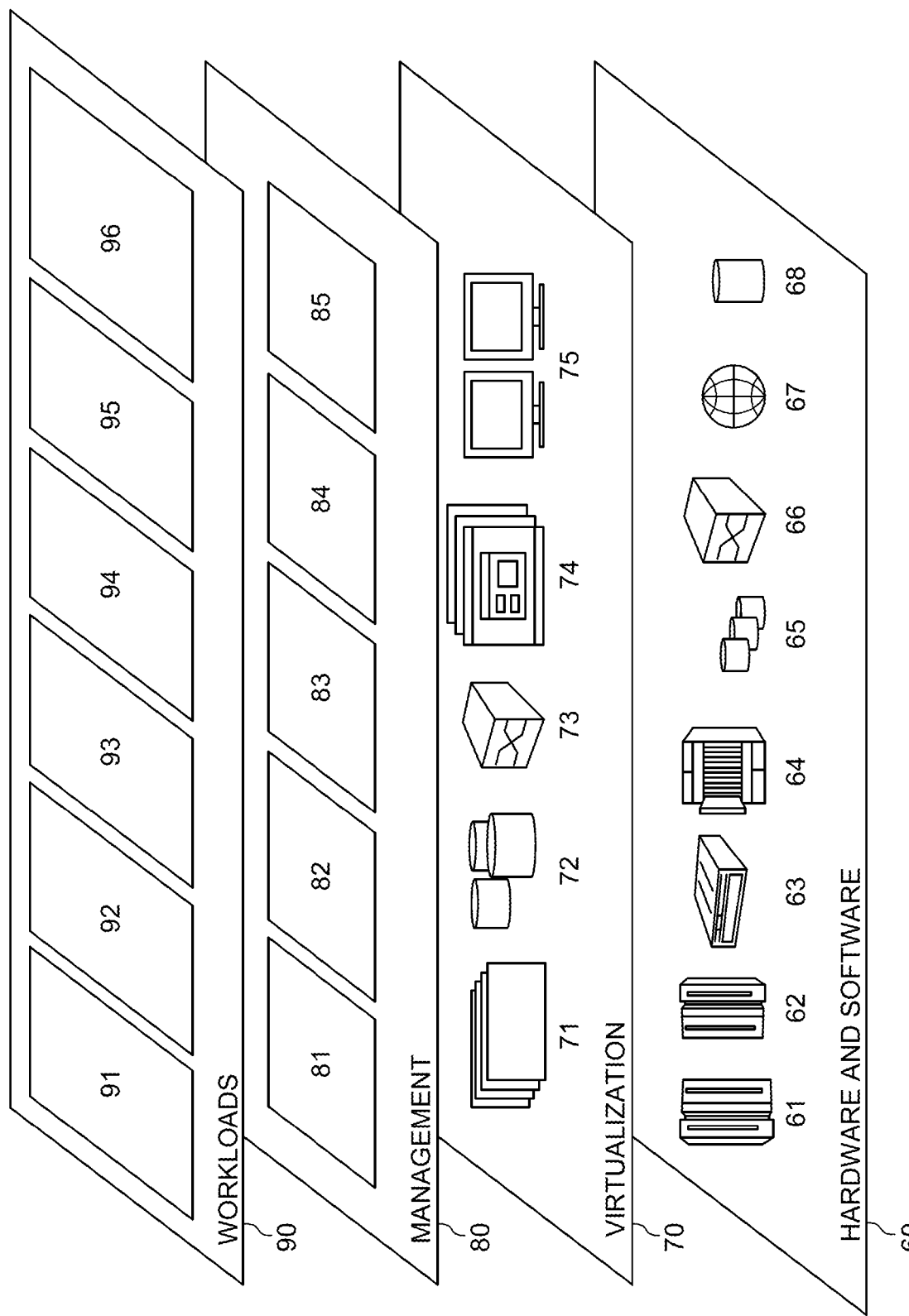
FIG. 5 depicts abstraction model layers according to an embodiment.

Referring now to FIG. 5, a set of functional abstraction layers provided by cloud computing environment 50 (FIG. 4) is shown. It should be understood in advance that the components, layers, and functions shown in FIG. 5 are intended to be illustrative only and embodiments of the invention are not limited thereto. As depicted, the following layers and corresponding functions are provided:

Hardware and software layer 60 includes hardware and software components. Examples of hardware components include: mainframes 61; RISC (Reduced Instruction Set Computer) architecture based servers 62; servers 63; blade servers 64; storage devices 65; and networks and networking components 66, such as a load balancer. In some embodiments, software components include network application server software 67 and database software 68.

Virtualization layer 70 provides an abstraction layer from which the following examples of virtual entities may be provided: virtual servers 71; virtual storage 72; virtual networks 73, including virtual private networks; virtual applications and operating systems 74; and virtual clients 75.

In one example, management layer 80 may provide the functions described below. Resource provisioning 81 provides dynamic procurement of computing resources and other resources that are utilized to perform tasks within the cloud computing environment. Metering and Pricing 82 provide cost tracking as resources are utilized within the cloud computing environment, and billing or invoicing for consumption of these resources. In one example, these resources may include application software licenses. Security provides identity verification for cloud consumers and tasks, as well as protection for data and other resources. User portal 83 provides access to the cloud computing environment for consumers and system administrators. Service level management 84 provides cloud computing resource allocation and management such that required service levels are met. Service Level Agreement (SLA) planning and fulfillment 85 provide pre-arrangement for, and procurement of, cloud computing resources for which a future requirement is anticipated in accordance with an SLA.

Workloads layer 90 provides examples of functionality for which the cloud computing environment may be utilized. Examples of workloads and functions which may be provided from this layer include mapping and navigation 91; software development and lifecycle management 92; virtual classroom education delivery 93; data analytics processing 94; transaction processing 95; and enhanced automated support agent applications 96. Enhanced automated support agent applications may refer to generating an augmented reality inspector to guide a user and enhance content submissions in support chats.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be accomplished as one step, executed concurrently, substantially concurrently, in a partially or wholly temporally overlapping manner, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The descriptions of the various embodiments of the present invention have been presented for purposes of illustration but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A computer-implemented method for enhancing content submissions of support chats comprised of:
    acquiring a support request, by an automated support agent, wherein the support request includes a content submission, the content submission selected from a group consisting of audio data, image data and text data;
    determining a classification type of the support request based on at least one of a request type of the support request and a comparison of the support request with an historical support request database,
    wherein the request type of the support request is determined by the automated support agent using a supervised machine learning classification model to classify the support request, the machine learning classification model being trained with training data corresponding to a plurality of industries, where each of the plurality of industries corresponds to a classification type for an industry of the plurality of industries, the historical support request database comprising information corresponding to previous support sessions for the plurality of industries, support requests corresponding to the previous support sessions, content submission corresponding the previous support requests, and a set of requirements corresponding to the classification type of the previous support request;
    obtaining a set of requirements for the support request from a server based on the determined classification type, the set of requirements comprising criteria for content submissions for the automated support agent to provide support to a user;
    determining that the content submission does not meet the set of requirements; and
    in response to the set of requirements not being met by the content submission, generating an augmented reality inspector to assist the user in adding content to meet the set of requirements, the augmented reality inspector capable of interacting with the user via audiovisual communication and text communication.

2. The computer-implemented method of claim 1, further comprising:
   detecting a change in the content submission for the support request;
   determining if the change in the content submission meets the set of requirements; and
   updating the augmented reality inspector based on the change in the content submission.

3. The computer-implemented method of claim 1, further comprising generating a three-dimensional (3D) or panoramic bubble photograph from the content submission.

4. The computer-implemented method of claim 1, wherein obtaining the set of requirements further comprises:
   selecting a previous support session from a plurality of previous support sessions, the previous support session including the support request, classified based on the request type;
   receiving a human interaction score for the selected previous support session, the human interaction score derived from crowd-sourced information including social media interaction data, the social media interaction data comprising user feedback resonance scores registered by a plurality of users corresponding to the determined classification type of the support request; and
   in response to the human interaction score being above a threshold, updating the set of requirements based on the content submission of the support request.

5. The computer-implemented method of claim 1, wherein generating the augmented reality inspector further comprises:
   displaying an image to the user, the image being visible to the user through an augmented reality device; and
   providing a set of instructions to the user for improving the content submission.

6. The computer-implemented method of claim 5, further comprising:
   monitoring an action of the user; and
   updating the set of instructions based on the action of the user.

7. The computer-implemented method of claim 1, further comprising:
   identifying by the automated support agent that the user is in need of support prior to the user requesting a support session;
   generating an automated support request having a classification type based at least on the user interactions accessible to the automated support agent; and
   initiating a support session with the user, by the automated support agent, using the automated support request.

8. A computer system comprising:
   one or more processors, one or more computer-readable memories, one or more computer-readable tangible storage media, and program instructions stored on at least one of the one or more tangible storage media for execution by at least one of the one or more processors via at least one of the one or more memories, wherein the computer system is capable of performing a method comprising:
   acquiring a support request, by an automated support agent, wherein the support request includes a content submission, the content submission selected from a group consisting of audio data, image data and text data;
   determining a classification type of the support request based on at least one of a request type of the support request and a comparison of the support request with an historical support request database,
   wherein the request type of the support request is determined by the automated support agent using a machine learning classification model to classify the support request, the machine learning classification model being trained with training data corresponding to a plurality of industries, where each of the plurality of industries corresponds to a classification type for an industry of the plurality of industries, the historical support request database comprising information corresponding to previous support sessions, support requests corresponding to the previous support sessions for the plurality of industries, content submission corresponding the previous support requests, and a set of requirements corresponding to the classification type of the previous support request;
   obtaining a set of requirements for the support request from a server based on the determined classification type, the set of requirements comprising criteria for content submissions for the automated support agent to provide support to a user;
   determining that the content submission does not meet the set of requirements; and
   in response to the set of requirements not being met by the content submission, generating an augmented reality inspector to assist the user in adding content to meet the set of requirements, the augmented reality inspector capable of interacting with the user via audiovisual communication and text communication.

9. The computer system of claim 8, further comprising:
   detecting a change in the content submission for the support request;
   determining if the change in the content submission meets the set of requirements; and
   updating the augmented reality inspector based on the change in the content submission.

10. The computer system of claim 8, further comprising generating a three-dimensional (3D) or panoramic bubble photograph from the content submission.

11. The computer system of claim 8, wherein obtaining the set of requirements further comprises:
   selecting a previous support session from a plurality of previous support sessions, the previous support session including the support request, classified based on the request type;
   receiving a human interaction score for the selected previous support session, the human interaction score derived from crowd-sourced information including social media interaction data, the social media interaction data comprising user feedback resonance scores of a plurality of users, and corresponding to the determined classification type of the support request; and
   in response to the human interaction score being above a threshold, updating the set of requirements based on the content submission of the support request.

12. The computer system of claim 8, wherein generating the augmented reality inspector further comprises:
   displaying an image to the user, the image being visible to the user through an augmented reality device; and
   providing a set of instructions to the user for improving the content submission.

13. The computer system of claim 12, further comprising:
   monitoring an action of the user; and updating the set of instructions based on the action of the user.

14. The computer system of claim 8, further comprising program instructions capable of performing:
   identifying by the automated support agent that the user is in need of support prior to the user requesting a support session;
   generating an automated support request having a classification type based at least on the user interactions accessible to the automated support agent; and
   initiating a support session with the user, by the automated support agent, using the automated support request.

15. A computer program product comprising:
   a computer readable storage device having program instructions embodied therewith, the program instructions executable by a processor to cause the processor to perform a method comprising:
   acquiring a support request, by an automated support agent, wherein the support request includes a content submission, the content submission selected from a group consisting of audio data, image data and text data;
   determining a classification type of the support request based on at least one of a request type of the support request and a comparison of the support request with an historical support request database,
   wherein the request type of the support request is determined by the automated support agent using a machine learning classification model to classify the support request, the machine learning classification model being trained with training data corresponding to a plurality of industries, where each of the plurality of industries corresponds to a classification type for an industry of the plurality of industries, the historical support request database comprising information corresponding to previous support sessions for the plurality of industries, support requests corresponding to the previous support sessions, content submission corresponding the previous support requests, and a set of requirements corresponding to the classification type of the previous support request;
   obtaining a set of requirements for the support request from a server based on the determined classification type, the set of requirements comprising criteria for content submissions for the automated support agent to provide support to a user;
   determining that the content submission does not meet the set of requirements; and
   in response to the set of requirements not being met by the content submission, generating an augmented reality inspector to assist the user in adding content to meet the set of requirements, the augmented reality inspector capable of interacting with the user via audiovisual communication and text communication.

16. The computer program product of claim 15, further comprising:
   detecting a change in the content submission for the support request;
   determining if the change in the content submission meets the set of requirements; and
   updating the augmented reality inspector based on the change in the content submission.

17. The computer program product of claim 15, wherein obtaining the set of requirements further comprises:
   selecting a previous support session from a plurality of previous support sessions, the previous support session including the support request, classified based on the request type;
   receiving a human interaction score for the selected previous support session, the human interaction score derived from crowd-sourced information including social media interaction data, the social media interaction data comprising user feedback resonance scores of a plurality of users, and corresponding to the determined classification type of the support request; and
   in response to the human interaction score being above a threshold, updating the set of requirements based on the content submission of the support request.

18. The computer program product of claim 15, wherein generating the augmented reality inspector further comprises:
   displaying an image to the user, the image being visible to the user through an augmented reality device; and
   providing a set of instructions to the user for improving the content submission.

19. The computer program product of claim 18, further comprising:
   monitoring an action of the user; and
   updating the set of instructions based on the action of the user.

20. The computer program product of claim 15, further comprising program instructions capable of performing:
   identifying by the automated support agent that the user is in need of support prior to the user requesting a support session;
   generating an automated support request having a classification type based at least on the user interactions accessible to the automated support agent; and
   initiating a support session with the user, by the automated support agent, using the automated support request.

* * * * *